United States Patent
Chen

(10) Patent No.: US 6,569,063 B2
(45) Date of Patent: May 27, 2003

(54) MAGNETS ADJUSTING DEVICE FOR BIKE EXERCISERS

(76) Inventor: Tsung-Yu Chen, No. 23-4, Ting-Liao, San-Ho Tsun, Shiu-Shang Hsiang, Chiayi Hsien (TW)

( * ) Notice: Subject to any disclaimer, the term of this patent is extended or adjusted under 35 U.S.C. 154(b) by 143 days.

(21) Appl. No.: 09/899,118

(22) Filed: Jul. 6, 2001

(65) Prior Publication Data

US 2003/0008753 A1 Jan. 9, 2003

(51) Int. Cl.[7] .......................... A63B 22/06; A63B 69/16
(52) U.S. Cl. ........................................... 482/63; 482/57
(58) Field of Search ...................... 482/57–65, 908, 482/903, 51

(56) References Cited

U.S. PATENT DOCUMENTS

| | | | | |
|---|---|---|---|---|
| 4,752,066 A | * | 6/1988 | Housayama | 482/63 |
| 5,031,901 A | * | 7/1991 | Saarinen | 482/63 |
| 5,145,480 A | * | 9/1992 | Wang | 482/63 |
| 5,466,203 A | * | 11/1995 | Chen | 482/63 |
| 6,095,953 A | * | 8/2000 | Lee et al. | 482/57 |
| 6,491,606 B1 | * | 12/2002 | Swift | 482/57 |

* cited by examiner

*Primary Examiner*—Stephen R. Crow
(74) *Attorney, Agent, or Firm*—Rosenberg, Klein & Lee

(57) ABSTRACT

A bike exerciser includes a resistance device connected to the frame of the exerciser and the resistance device has a base board fixedly connected to the frame and a movable board movably restrained on the base board. A plurality of magnets are connected to movable board. A lever is connected to the frame and a connection member is connected between the movable board and the lever. The connection member movably extends through a tube and a first end member is connected to an end of the tube, and a second end member is connected to the movable board. A spring is mounted to the connection member and biased between the first end member and the second end member. The movable board is moved to let the magnets move toward the wheel of the exerciser by pivoting the lever.

3 Claims, 4 Drawing Sheets

MAGNETS ADJUSTING DEVICE FOR BIKE EXERCISERS

FIELD OF THE INVENTION

The present invention relates to a magnet adjusting device for bike exercisers wherein the magnets are connected on a board which is moved toward a wheel by pulling a lever.

BACKGROUND OF THE INVENTION

A conventional bike exerciser generally includes a frame and a seat and a handlebar are respectively connected to the frame. A wheel is driven by a belt which is moved by rotating a crank. The user sits in the seat and holds the handlebar with his/her hands, and rotates the crank with his/her legs to rotate the wheel. A resistance device is connected to the frame to provide friction to the wheel so as to exercise the user. The resistance device includes several magnets which is moved toward a metal wheel by a belt. The magnetic force between the wheel and the magnets can be transferred to be a resistant force on the wheel. The magnets are enclosed in the resistance device so that it is inconvenient to maintain the resistance device. The movement of the resistance device is made by the belt, however, the belt cannot precisely drive the device and the gap between the resistance device and the wheel can not be controlled as desired.

SUMMARY OF THE INVENTION

In accordance with one aspect of the present invention, there is provided a bike exerciser which comprises a frame having a seat and a handlebar respectively connected thereto. A wheel and a crank are connected to the frame with a transferring device connected thereto. A resistance device is connected to the frame and has a base board fixedly connected to the frame and a movable board is movably restrained on the base board. A plurality of magnets are connected to movable board and a lever is connected to a connection member which is connected to the movable board. The connection member movably extends through a tube and a first end member is connected to an end of the tube. A second end member is connected to the movable board. A spring is mounted to the connection member and biased between the first end member and the second end member.

The primary object of the present invention is to provide a resistance device which an be easily maintained.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
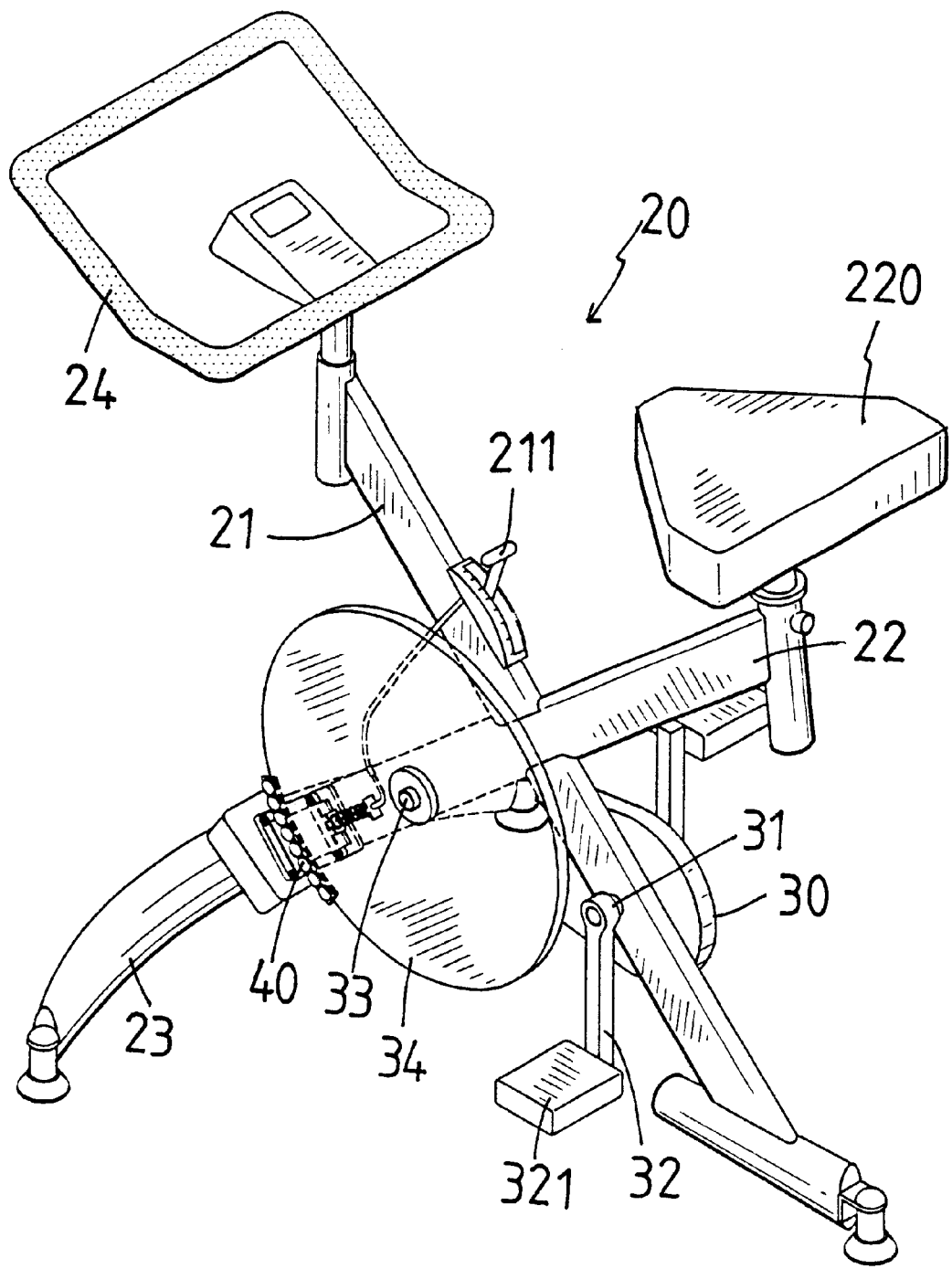
FIG. 1 is a perspective view to show the bike exerciser of the present invention.
Figure 2:
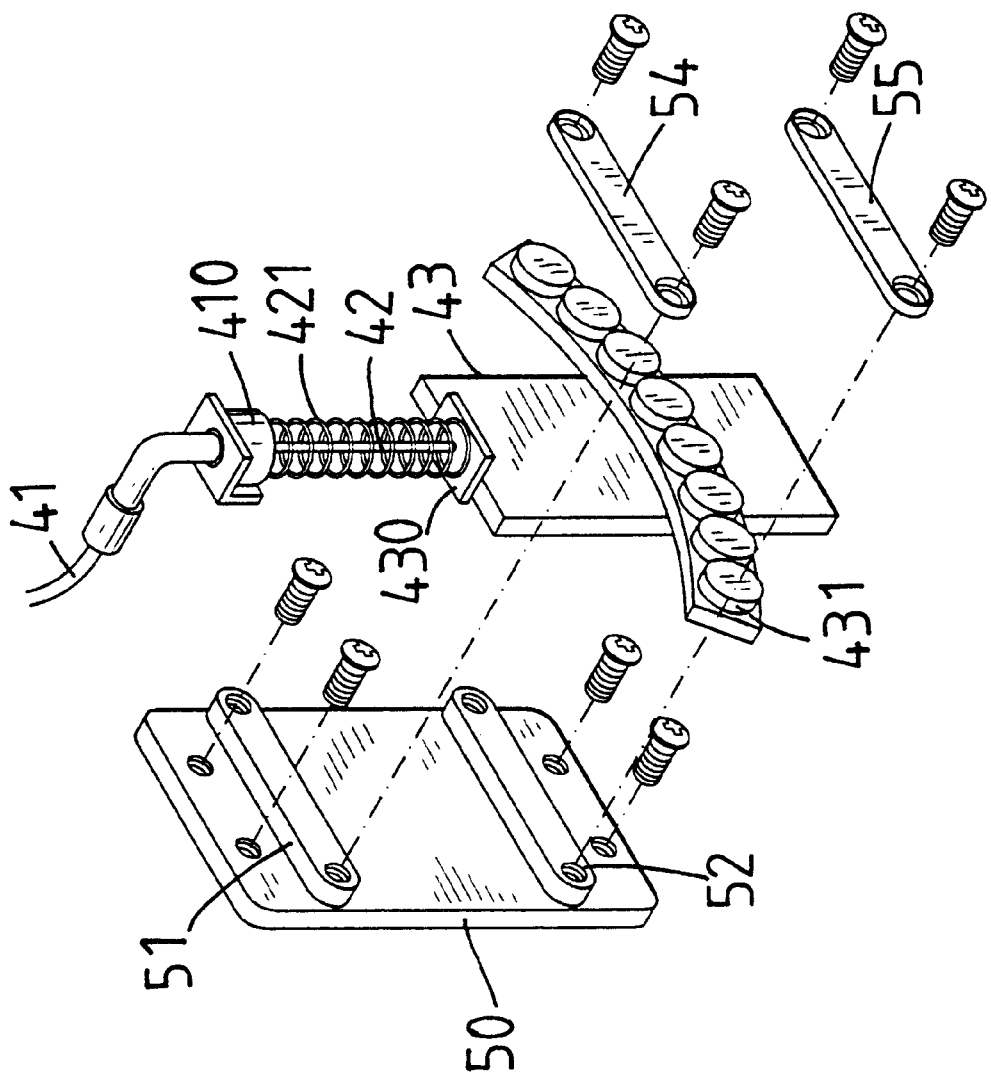
FIG. 2 is an exploded view to show the resistance device on the bike exerciser of the present invention.
Figure 3:
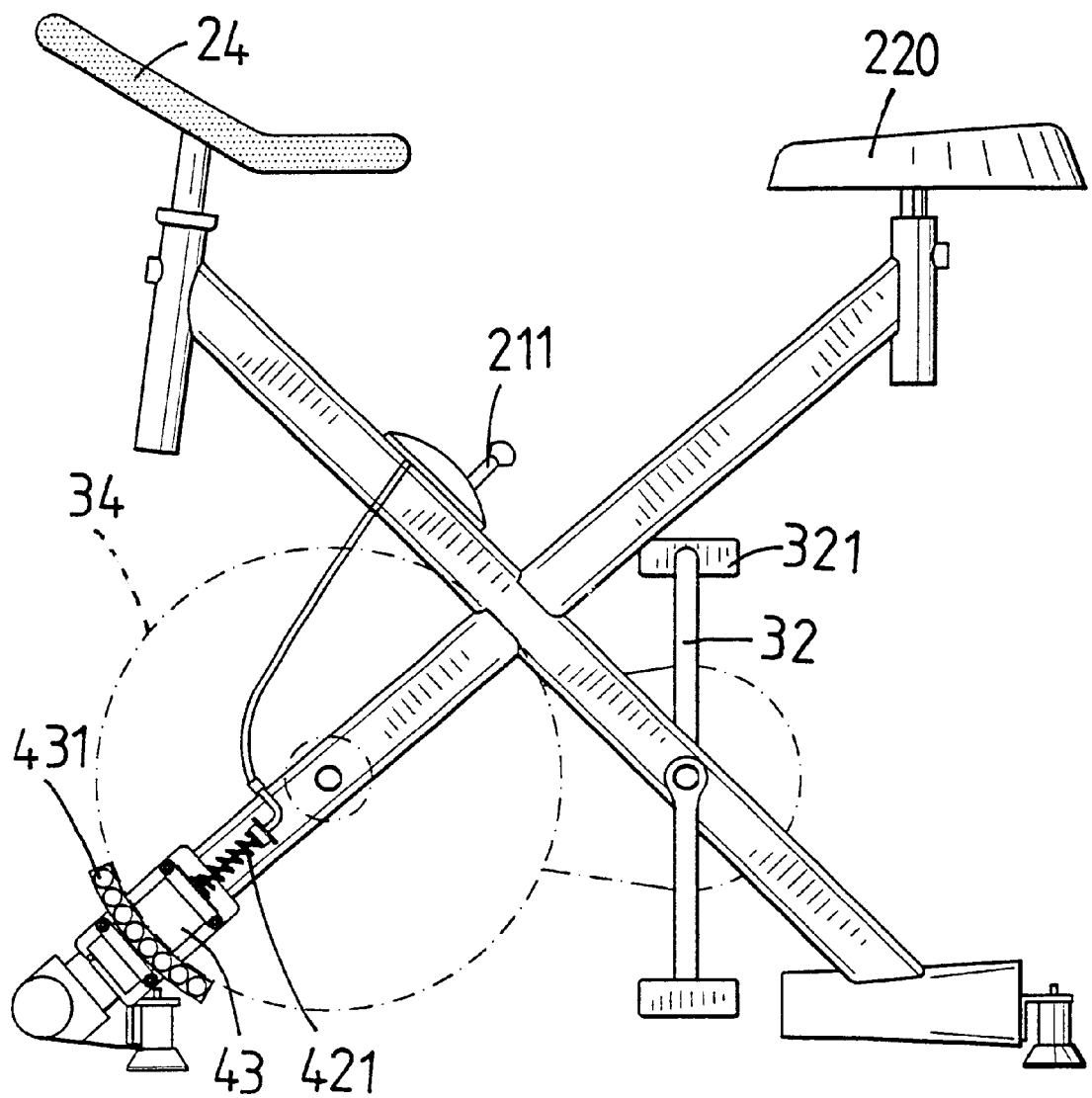
FIG. 3 is a side view to illustrate the bike exerciser of the present invention, wherein the magnets are not moved.

Referring to FIGS. 1 to 3, the bike exerciser of the present invention comprises a frame having arcuate ground frame 23 which has two ends contacting the ground and a first rod 22 extends from the arcuate ground frame 23. A seat 220 is connected to the first rod 22. A second rod 21 connected to the first rod 22 and a handlebar 24 is connected to the second rod 21. A wheel 34 and a crank 32 are respectively connected to the first rod 22 and the second rod 21. A transferring device 30 is connected between the wheel 34 and the crank 32 which has two pedals 321 connected to two ends thereof. The wheel 34 can be rotated by the transferring device 30 when rotating the crank 32.

A resistance device 40 is connected to the first rod 22 and has a base board 50 fixedly connected to the first rod 22. Two protrusions 51, 52 extend from the base board 50 and two retaining bars 54, 55 are connected to the two protrusions 51, 52 by bolts. A movable board 43 is movably inserted between the protrusions 51, 52 and the retaining bars 54, 55. The movable board 43 has a curve plate connected thereto and a plurality of magnets 431 are connected to the curve plate.

A lever 211 is connected to the second rod 21 and a connection member 42 is connected between the movable board 43 and the lever 211. The connection member 42 movably extends through a tube 41 and a first end member 410 is connected to an end of the tube 41, and a second end member 430 is connected to the movable board 43. A spring 421 is mounted to the connection member 42 and biased between the first end member 421 and the second end member 430.

Figure 4:
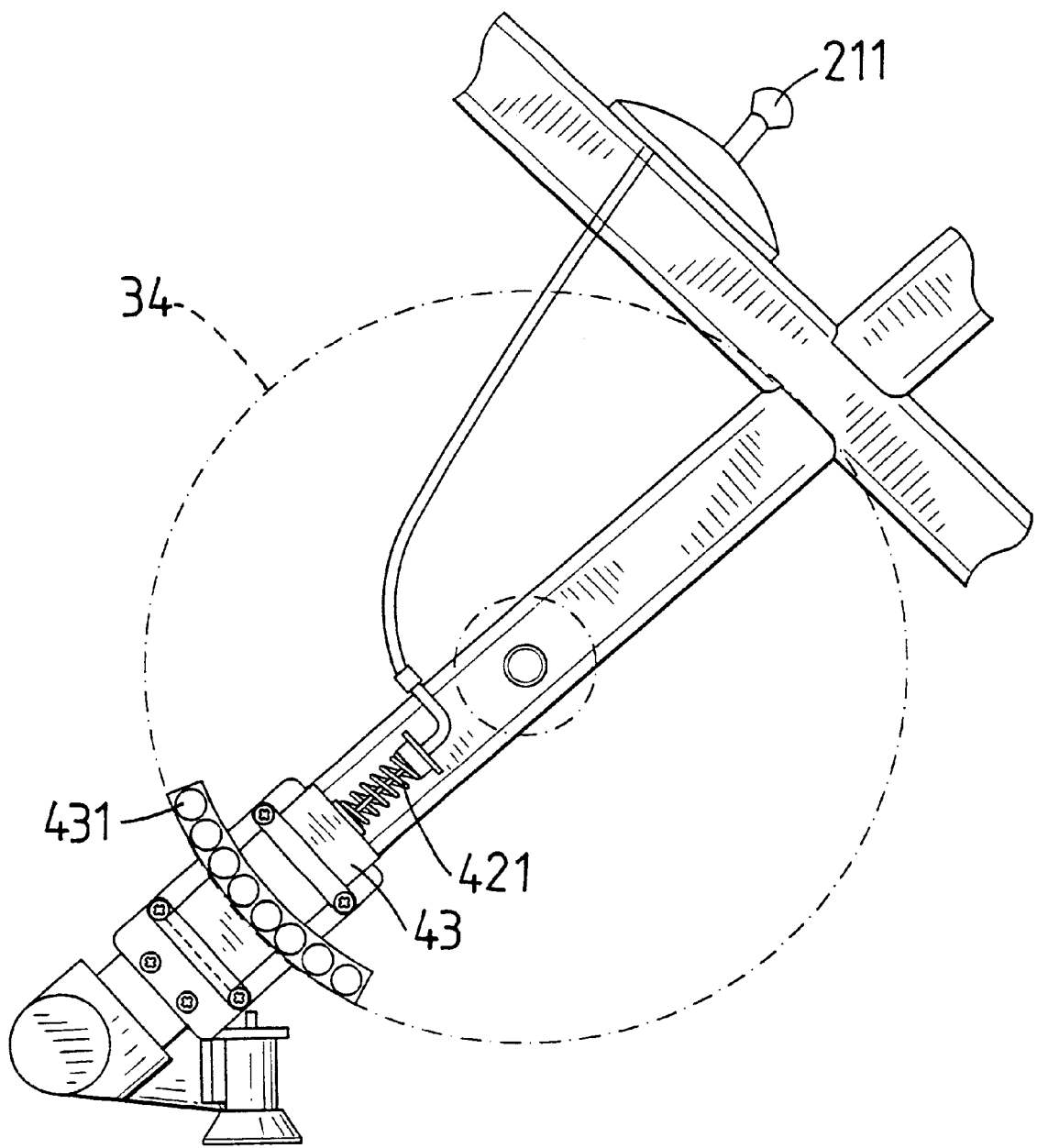
FIG. 4 is a side view to illustrate the bike exerciser of the present invention, wherein the magnets are moved toward the wheel.

The user may pull the lever 211 and the movable board 43 is pulled by the connection member 42 so that the magnets 431 are moved toward the wheel 34. When the magnets 431 are moved to the position as shown in FIG. 4, they are functioned with the wheel 34 and a friction force is applied to the wheel 34. The magnets 341 are easily accessible so that they are easily to be maintained and the position of the magnets 431 can be precisely positioned relative to the wheel 34 because they are connected on the curve plate.

While we have shown and described the embodiment in accordance with the present invention, it should be clear to those skilled in the art that further embodiments may be made without departing from the scope of the present invention.

What is claimed is:

1. A bike exerciser comprising:

a frame having a seat and a handlebar respectively connected thereto, a wheel and a crank connected to said frame with a transferring device connected therebetween, said wheel being rotated by said transferring device when rotating said crank;

a resistance device connected to said frame and having a base board fixedly connected to said frame and a movable board movably restrained on said base board, a plurality of magnets connected to movable board, and a lever connected to said frame and connected to a connection member which is connected to said movable board, said connection member movably extending through a tube and a first end member connected to an end of said tube, a second end member connected to said movable board, a spring mounted to said connection member and biased between said first end member and said second end member.

2. The bike exerciser as claimed in claim 1, wherein said base board has two protrusions and two retaining bars connected to said two protrusions, said movable board movably inserted between said protrusions and said retaining bars.

3. The bike exerciser as claimed in claim 1, wherein said movable board has a curve plate connected thereto and said magnets are connected to said curve plate.

* * * * *